US012529286B2

(12) United States Patent
Silva

(10) Patent No.: US 12,529,286 B2
(45) Date of Patent: Jan. 20, 2026

(54) SELECTIVELY ACTIVATING A WELLBORE CHECK VALVE

(71) Applicant: Royal Completion Tools, LLC, Houston, TX (US)

(72) Inventor: Zachary Silva, Pinehurst, TX (US)

(73) Assignee: Royal Completion Tools, LLC, Houston, TX (US)

( * ) Notice: Subject to any disclaimer, the term of this patent is extended or adjusted under 35 U.S.C. 154(b) by 0 days.

(21) Appl. No.: 18/636,135

(22) Filed: Apr. 15, 2024

(65) Prior Publication Data

US 2024/0344426 A1 Oct. 17, 2024

Related U.S. Application Data

(60) Provisional application No. 63/495,917, filed on Apr. 13, 2023.

(51) Int. Cl.
*E21B 34/14* (2006.01)
*E21B 33/12* (2006.01)
*E21B 33/134* (2006.01)
*F16K 15/00* (2006.01)

(52) U.S. Cl.
CPC ............ *E21B 34/142* (2020.05); *E21B 33/12* (2013.01); *E21B 33/134* (2013.01); *F16K 15/00* (2013.01); *E21B 2200/06* (2020.05)

(58) Field of Classification Search
CPC ... E21B 34/142; E21B 33/134; E21B 2200/06
See application file for complete search history.

(56) References Cited

U.S. PATENT DOCUMENTS 2,925,865 A * 2/1960 Oliver ..................... E21B 33/16 166/117
3,044,553 A * 7/1962 Bradley ................ E21B 33/127 166/131
5,117,910 A * 6/1992 Brandell ................ E21B 34/14 166/185
5,810,084 A * 9/1998 Echols .................... E21B 17/06 166/242.7
6,050,334 A * 4/2000 McGarian ............... E21B 23/01 166/117.6
6,394,180 B1 * 5/2002 Berscheidt ............ E21B 33/128 166/135
10,138,709 B2 11/2018 Shaffer et al.
(Continued)

*Primary Examiner* — Neel Girish Patel
(74) *Attorney, Agent, or Firm* — Compass IP Law PC

(57) ABSTRACT

A contingency measure for wireline conveyed installation methods, generally for oil and gas completions, and more specifically in plug and perforation completions. A fracturing (frac) plug has a ported sleeve and a seat that allows a valve mechanism to seat against the apparatus with the application of fluid flow. The plug allows for fluid flow to bypass the valve and flow through the frac plug, to allow pump down operations as long as needed. Once downhole operations are complete, increased fluid pressure on the plug pushes the valve past the bypass ports and plugs the flow through the inner diameter of the frac plug, closing off the fluid flow path through the frac plug. Thus, selective setting of the valve allows for downhole fluid flow as long as needed, and then can hydraulically isolate the region above the frac plug from the region below the frac plug.

10 Claims, 10 Drawing Sheets

(56) References Cited

U.S. PATENT DOCUMENTS

| | | | | |
|---|---|---|---|---|
| 10,184,317 | B2 | 1/2019 | Silva et al. | |
| 10,240,446 | B2 | 3/2019 | Roessler et al. | |
| 10,246,971 | B2 * | 4/2019 | Doane | E21B 34/103 |
| 10,280,706 | B1 * | 5/2019 | Sharp, III | E21B 33/134 |
| 10,808,479 | B2 * | 10/2020 | DiRocco | E21B 33/10 |
| 11,834,919 | B2 * | 12/2023 | Schultz | E21B 23/0413 |
| 11,891,877 | B1 * | 2/2024 | Crews | E21B 34/103 |
| 2010/0132954 | A1 | 6/2010 | Telfer | |
| 2011/0240295 | A1 * | 10/2011 | Porter | E21B 33/134 166/308.1 |
| 2013/0277044 | A1 * | 10/2013 | King | E21B 43/26 166/192 |
| 2017/0101849 | A1 | 4/2017 | Silva | |
| 2018/0094508 | A1 * | 4/2018 | Smith | E21B 43/26 |
| 2021/0404285 | A1 * | 12/2021 | Reyes Villegas | E21B 33/1292 |
| 2022/0228460 | A1 * | 7/2022 | Goodman | E21B 33/13 |

* cited by examiner

SELECTIVELY ACTIVATING A WELLBORE CHECK VALVE

PRIORITY

The application is a nonprovisional application based on, and claims the benefit of priority of, U.S. Provisional Patent Application No. 63/495,917, filed Apr. 13, 2023. The provisional application is hereby incorporated by reference.

TECHNICAL FIELD

Descriptions are generally related to drilling, and more particular descriptions are related to wellbore valves.

BACKGROUND OF THE INVENTION

Drilling operations involve drilling a wellbore, then deploying tools downhole in wellbore to provide pumping of fluids (gas or liquid). Wireline or slickline operations are used for the deployment of a wide range of downhole tools. Deployment is currently performed with the use of surface pumping units to pump the bottom hole assembly down with fluid flow, coil tubing or piping to push the bottom hole assembly down, or the use of a tractor unit to haul the bottom hole assembly down mechanically.

Each conveyance method has specific drawbacks, with the tractor, coil tubing, and pipe style deployment requiring excessive amounts of time, as well as additional surface equipment on location. There can be significant costs for surface equipment downtime when not in use. The pumping method requires a wellbore that is fluidically communicating with the formation beyond the wellbore for fluid flow to be possible.

The drawbacks of one installation method can often lead to the use of another method. For example, when a wellbore is unable to allow fluid communication to the formation for pump operation, it may become necessary to mechanically deploy the bottom hole assembly with a tractor, coil tubing, or even pipe installation.

In oil and gas operations, and specifically in unconventional hydraulic fracturing operations where the amount of asset nonproductive time on surface can be hugely increased, the chances of deployments occurring in a wellbore with no fluid communication are drastically increased due to the nature of bridge plug installation or packer installation. The deployment of a downhole barrier, such as a bridge plug or packer, requires the setting of the barrier after the bottom hole assembly is pumped downhole, utilizing existing flow paths to enable surface pumping.

Setting the barrier effectively eliminates the existing flow path, and the bottom hole assembly then utilizes perforating guns to penetrate the casing above the plug/packer and introduce new flow paths above the barrier, both for hydraulic fracturing operations and for the next bottom hole assembly deployment. However, if the perforating guns fail to activate, the wellbore remains plugged to fluid flow, and a new perforating gun assembly must either be conveyed with a tractor or pushed by coil tubing back to the setting depth to again attempt to perforate the casing and introduce a flow path. Such operations result in extensive nonproductive downtime for surface assets, as well as introducing the risks inherent in installing new deployment equipment in the completion.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
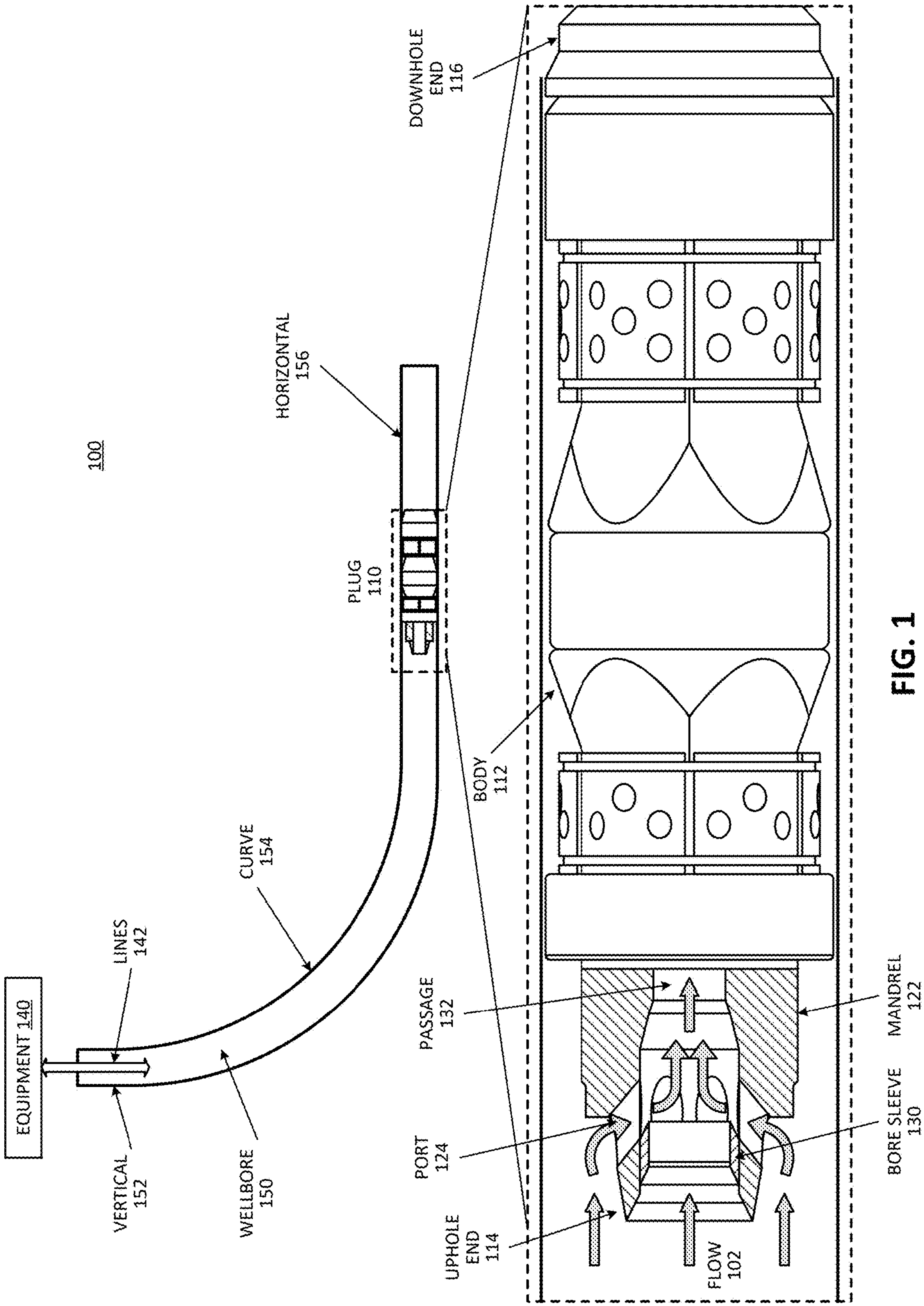
FIG. 1 is an example of a wellbore with a downhole barrier tool.

Descriptions of certain details and implementations follow, including non-limiting descriptions of the figures, which may depict some or all examples, and well as other potential implementations.

DETAILED DESCRIPTION OF THE INVENTION

As described herein, a contingency measure for wireline conveyed installation methods, generally for oil and gas completions, and more specifically in plug and perforation completions. A fracturing (frac) plug has a ported sleeve and a seat that allows a valve mechanism to seat against the apparatus with the application of fluid flow. During deployment of the frac plug, fluid flow is used to pump the wireline bottom hole assembly (BHA) to depth, and when the frac plug is set, that fluid flow path is eliminated if the frac plug was installed with a ball on seat, or in a similar bridge plug configuration.

Typically, a bottom hole assembly is moved uphole to perforate the casing and establish new fluid flow paths into the formation, for use during hydraulic fracturing and during deployment of the next wireline bottom hole assembly requiring fluid flow for pump down for the subsequent stage to be completed. If the perforating guns fail to fire and the frac plug was installed with a ball on seat, or in a similar bridge plug configuration, there is no fluid access to the formation and secondary or tertiary installation attempts will historically need to be performed to convey another perforating gun string to depth, such as tractor or coiled tubing conveyance methods.

The plug includes a seating apparatus, which allows for a freely moving valve (e.g., a frac ball or wellbore dart) to seat against the plug with the application of fluid flow, such as during secondary pump down operations of a perforating gun bottom hole assembly. The plug herein includes a first valve seat and a second valve seat, where the first valve seat can be referred to as a false seat or a preliminary seat. The first seat holds the valve in an initial position in the plug.

The plug has ports, which can be ports in the mandrel or ports in a sleeve, which allow for fluid flow to bypass the valve and flow through the inner diameter of the frac plug, to allow pump down operations as long as needed. Once pump down operations are complete, increased fluid pressure on the plug pushes the valve into the second seat, past the bypass ports, which plugs the flow through the inner diameter of the frac plug, closing off the fluid flow path through the frac plug. Thus, selective setting of the valve allows for downhole pressure as long as needed, and then can hydraulically isolate the region above the frac plug from the region below the frac plug.

The plug provides a contingency method that applies for the use of barrier deployments that utilize a ball ran on seat, since, although the ball can be pushed off seat from a pressure difference below the barrier (e.g., uphole pressure), the ball acts as a check valve to any fluid flow (e.g., downhole pressure) attempting to bypass the barrier to access the existing flow path below the barrier.

FIG. 1 is an example of a wellbore with a downhole barrier tool. System 100 illustrates a downhole barrier tool, such as a fracturing plug assembly with a bore sleeve installed. System 100 illustrates wellbore 150, which includes the vertical portion vertical 152, the curved portion curve 154, and the horizontal portion horizontal 156.

The well can be drilled vertically to a known depth, then curved and drilled to a known horizontal position. Equipment 140 represents the surface equipment used to deploy and control the wellbore equipment. Lines 142 represent the lines used to set and manage the downhole equipment.

Plug 110 represents a frac plug at a specific horizontal position in wellbore 150, which provides hydraulic isolation between the uphole end of the plug and the downhole end of the plug. Plug 110 can operate as a fluid valve in the pipe of wellbore 150. In one example, plug 110 is one of a series of frac plugs at different horizontal locations in wellbore 150. A series of plugs can provide the ability to work at different locations in wellbore 150. More specifically, the operator can perform operations at one location, then seal off the downhole portion of the borehole, moving up to a next uphole location to install another plug in the series and continue operations.

Plug 110 has body 112, where the details of the body are not illustrated or specified in system 100. Plug 110 has uphole end 114, which is the portion of the plug closest to the surface, and downhole end 116, which is the portion of the plug furthest down wellbore 150. Plug 110 represents a fracturing plug assembly, which can be made of readily available material, such as composite, ceramic, elastomer, alloy steel, cast iron, or other materials, or a combination of materials.

Mandrel 122 is on the uphole end of plug 110. Mandrel 122 has a fully open passage on the inner diameter of the mandrel, which allows for fluid communication between uphole end 114 and downhole end 116 when it is set in the casing of wellbore 150. The open passage is identified by passage 132. Flow 102 represents a flow of fluid from downhole pressure. It will be understood that downhole pressure applies pressure on uphole end 114 of plug 110, pushing fluid against the end closest to the surface from equipment 140. Uphole pressure applies pressure on downhole end 116 of plug 110, with fluid pushing from downhole on the end of the plug down the hole.

In one example, mandrel 122 has ports, represented by port 124. Port 124 is a channel or an opening through mandrel 122, allowing fluid communication from the outer diameter of mandrel 122 to its inner diameter where passage 132 is. More specifically, port 124 represents ports extending from uphole end 114.

In one example, the plug assembly includes bore sleeve 130 inserted into mandrel 122, on the inner diameter of the mandrel. Bore sleeve 130 can be held in place relative to port 124. Bore sleeve 130 is movable within the open internal passage in mandrel 122 at uphole end 114. When bore sleeve moves downhole with a frac ball (as described below), passage 132 is selectively blocked. Fluid flow 102 from uphole end 114 flows through port 124 and passage 132 to downhole end 116 of the fracturing plug assembly when plug 110 is set in the casing of wellbore 150.

Figure 2:
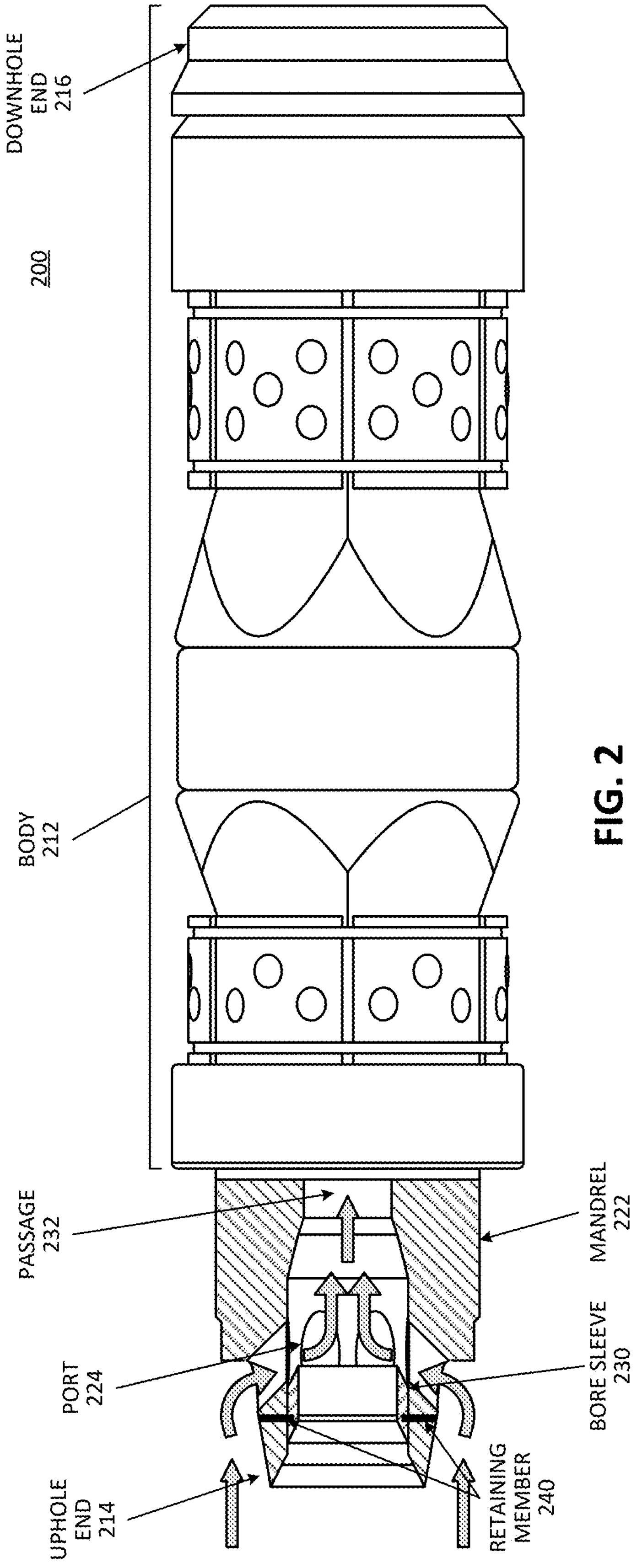
FIG. 2 is an example of a downhole barrier tool with a bore sleeve.

FIG. 2 is an example of a downhole barrier tool with a bore sleeve. Assembly 200 is an example of a plug assembly in accordance with an example of plug 110 of system 100. Assembly 200 illustrates an example of a barrier tool with a bore sleeve installed with a retaining member.

Assembly 200 represents a frac plug having body 212, uphole end 214, and downhole end 216. Assembly 200 includes mandrel 222, which has passage 232 through an inner diameter of the plug to enable fluid flow from uphole end 214 to downhole end 216. Port 224 represents ports to the inner diameter of mandrel 222. While not specifically labeled in assembly 200, it will be understood that mandrel has an opening at uphole end 214 and at downhole end 216. The ports through mandrel 222 are not specifically illustrated in assembly 200.

Assembly 200 illustrates retaining member 240, which represents a force-adjustable release mechanism for the plug. Retaining member 240 secures bore sleeve 230 in an initial position, holding the position of bore sleeve 230 relative to port 224. While not specifically illustrated, bore sleeve 230 holds a valve member in a way to block uphole end 214 of the plug, while allowing flow through port 224.

Retaining member 240 can represents a force adjustable release mechanism, which can be referred to as a shear release, can be or include a shear screw, a set of shear screws, a snap ring, a collet, spring-loaded dogs, or other detent mechanism that allows axial movement once an axial threshold load is reached. In one example, retaining member 240 represents screws to hold bore sleeve, which in turn can hold a frac ball until downhole pressure exceeds the shear strength or shear force of the retaining member. In one example, retaining member 240 has a selectable shear strength, allowing different shear strengths for different applications.

In response to an increase in fluid pressure exceeding the shear force of the retaining member, the retaining member will release the ball, allowing it to move, or will release the sleeve, allowing the ball to move. The system can select the shear strength to match the applied force capability of the application in which the plug is applied. Thus, the shear strength can be set to match different fluid pressure capabilities of the system in which the plug is installed.

With the shear of retaining member 240, bore sleeve 230 is free to move within the open passage in mandrel 222 at uphole end 214 until is abuts the mandrel seat, as described below. As also described below, in one example, the uphole end of the plug can have a ported sleeve connected to the mandrel, and bore sleeve 230 could be movable within the ported sleeve. When a ported sleeve is used, bore sleeve 230 can be within the internal diameter of the ported sleeve, movable within the ported sleeve. The ported sleeve has an internal passage that couples to the internal passage of the mandrel.

Figure 3A:
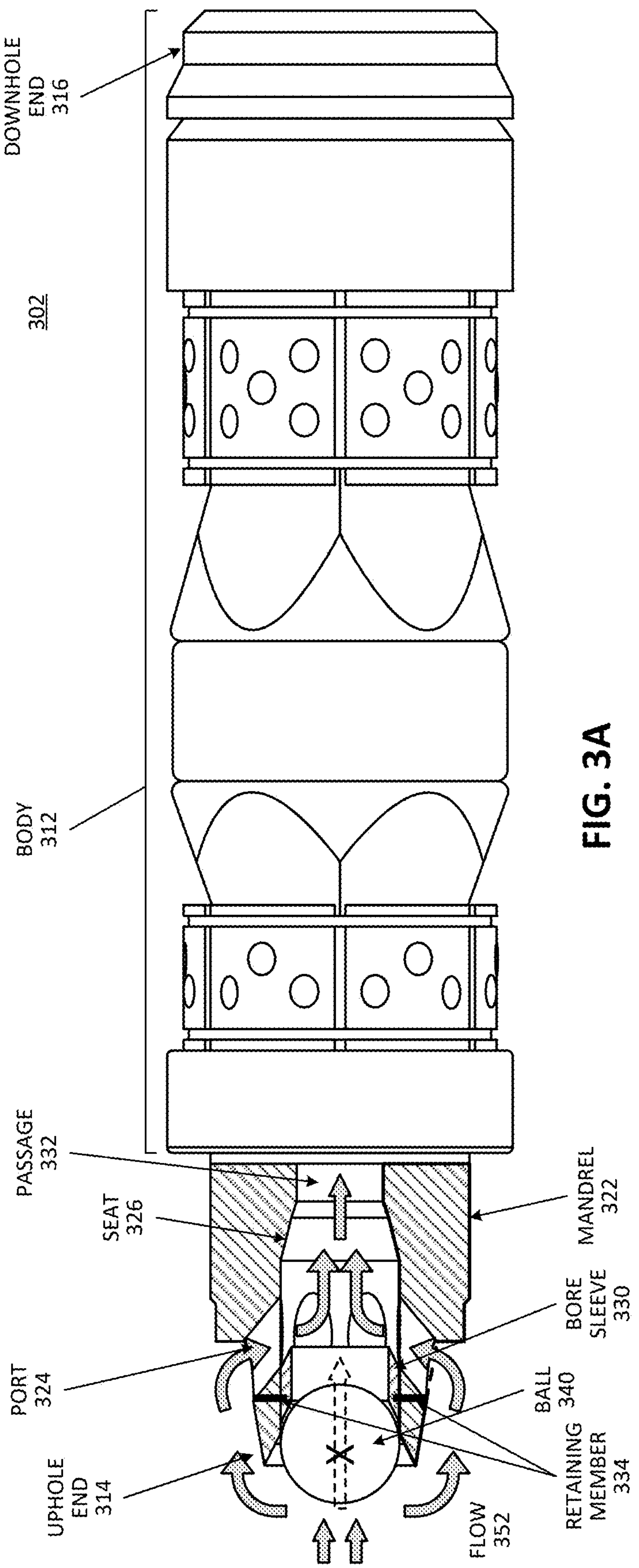
FIG. 3A is an example of a downhole barrier tool of FIG. 2 with a frac ball in contact with a bore sleeve.

FIG. 3A is an example of a downhole barrier tool with a ported mandrel. Assembly 302 is an example of a plug assembly in accordance with an example of plug 110 of system 100 or an example of assembly 200. Assembly 302 illustrates an example of a barrier tool with a bore sleeve installed with a retaining member, holding a frac ball in place with the bore sleeve.

Assembly 302 represents a frac plug having body 312, uphole end 314, and downhole end 316. Assembly 302 includes mandrel 322, which has passage 332 through an inner diameter of the plug to enable fluid flow from uphole end 314 to downhole end 316. Port 324 represents ports to the inner diameter of mandrel 322, through mandrel 322.

Assembly 302 illustrates retaining member 334, which represents a force-adjustable release mechanism for the plug. In one example, retaining member 334 is adjustable to different amounts of force to release or shear the retainer. Retaining member 334 secures bore sleeve 330 in an initial position, holding the position of bore sleeve 330 relative to port 324.

Ball 340 represents a valve member, such as a frac ball or a dart. Bore sleeve 330 holds ball 340 in a way to block flow 352 from going through the inner diameter directly at uphole end 314. Instead of flowing directly into the end of mandrel 322, flow 352 allows fluid to flow through port 324, to flow from the outer diameter to the inner diameter of mandrel 322. More specifically, flow 352 does not pass through bore sleeve 330, and only passes through port 324 with ball 340 seated against bore sleeve 330. Retaining member 334 holds bore sleeve 330, which in turn holds ball 340 when ball 340 is in contact with bore sleeve 330 due to downhole pressure on assembly 302.

The restriction and redirection of fluid flow 352 caused by ball 340 contacting bore sleeve 330 results in an increase in the wellbore pressure at uphole end 314, above the fracturing plug assembly. It will be understood that increasing the flow rate of flow 352 will increase the downhole pressure on uphole end 314.

After wellbore operations have been completed, ball 340 is ready to provide pressure isolation between uphole end 314 and downhole end 316. The plug of assembly 302 has ball 340 on a first seat, where fluid pressure unsets the ball from the first seat to set against a second seat. In one example, assembly 302 has the ability to set ball 340 against seat 326, and can then flow ball 340 back uphole.

Figure 3B:
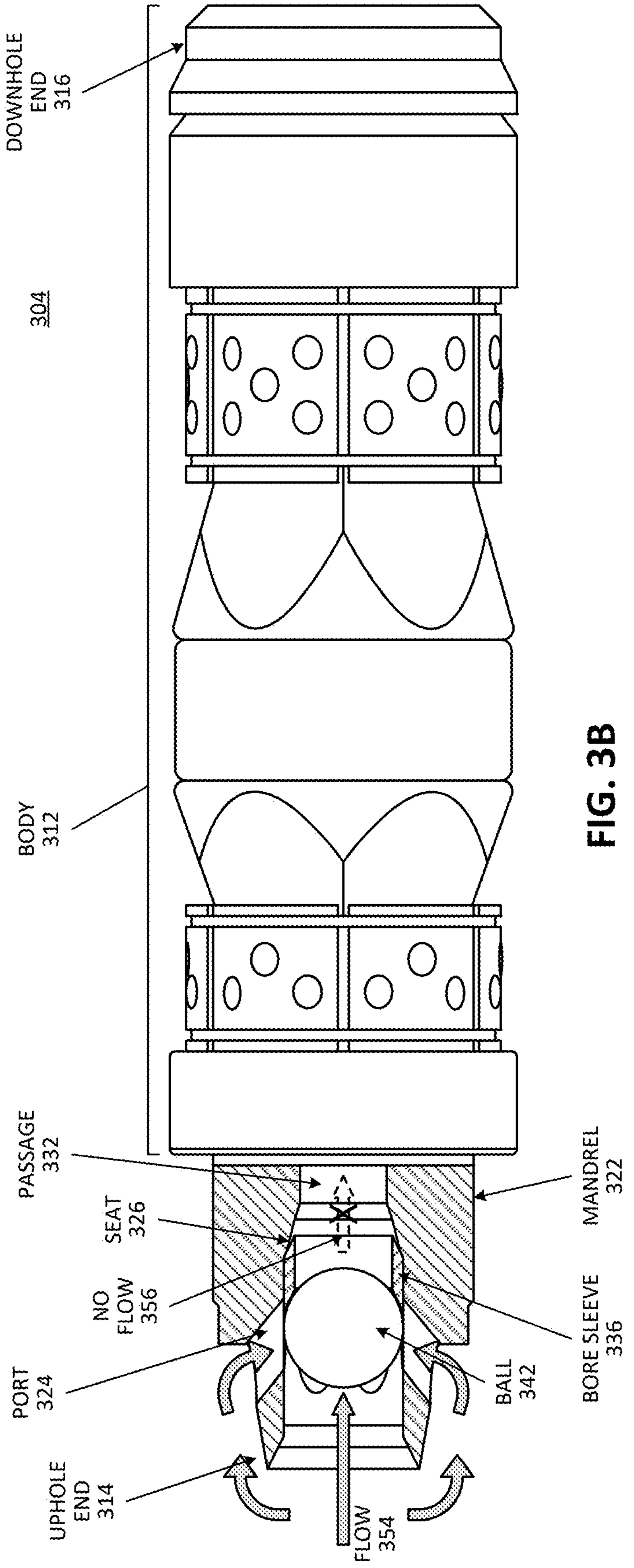
FIG. 3B is an example of the downhole barrier tool of FIG. 3A with a frac ball in contact with a bore sleeve, which is in contact with a mandrel seat.

FIG. 3B is an example of the downhole barrier tool of FIG. 3A with a frac ball in contact with a bore sleeve, which is in contact with a mandrel seat. Assembly 304 represents a state of assembly 302 after application of fluid pressure causes the ball to move into the internal seat, blocking fluid flow through the internal passage.

The bore sleeve secured to mandrel 322 can be a first seat, which can be referred to as a false seat. In assembly 304, the bore sleeve has been sheared from the first seat position and moved to seat 326, as represented by bore sleeve 336, which is the same bore sleeve in a new position. Seat 326 is a seat structure within the open internal passage of the inner diameter of mandrel 322. When the bore sleeve releases from the mandrel and moves downhole in the inner diameter of mandrel 322, the valve also moves, as represented by ball 342, which is the frac ball in a new position.

In the first seat position, assembly 302 allows flow 352 through port 324. In assembly 304, ball 342 and bore sleeve 336 are positioned against seat 326, past port 324 and blocking passage 332. When ball 342 (or bore sleeve 336 and ball 342) abut seat 326, they block the flow of fluid through ports 324 to the internal open passage of mandrel 322 and body 312. Thus, flow 354 can exert pressure on the plug, but there is no flow 356 through the inner diameter of the plug assembly. Seat 326 can be referred to as a second seat, or a seat in the second position. Seat 326 is the mandrel seat.

Flow 354 represents a higher flow rate, which increases the flow rate beyond a threshold rate, increasing the downhole pressure sufficient to release retaining member 334. In one example, releasing retaining member 334 refers to shearing the retaining member. Releasing the retaining member can allow ball 342 to remain free to travel in the direction of fluid flow. The fluid flow illustrated is flow 354. However, decreasing flow 354 could allow pressure from downhole to push the flow back uphole, and ball 342 could travel uphole with the direction of fluid flow. When ball 342 pushes bore sleeve 336 until mechanically impeded by seat 326, it results in closure of the fluid flow path through passage 332, resulting in pressure isolation between uphole end 314 and downhole end 316.

In one example, assembly 302 and assembly 304 represent a downhole plug assembly. In one example, the assembly can be installed in a downhole packer. The assembly allows for the maintaining of fluid communication above and below the packer after being set within the wellbore, enabling the deployment equipment to perform other operations without the risk of losing fluid communication, such as perforating a stage above a set plug or reinstallation of perforating equipment to perforate said stage.

After all other operations have been completed, the apparatus can be triggered to close off communication from above the packer or plug, while still allowing fluid flow from below. In the case of plug and perf completion methods, the untriggered "open" state of the assembly will allow for further equipment deployments via pump down or any other flow related operations, and the triggered "closed" state will allow for hydraulic fracturing operations to occur while still allowing reversing flow from below the apparatus, in the event that the wellbore needs to be surged or cleaned out.

Figure 4A:
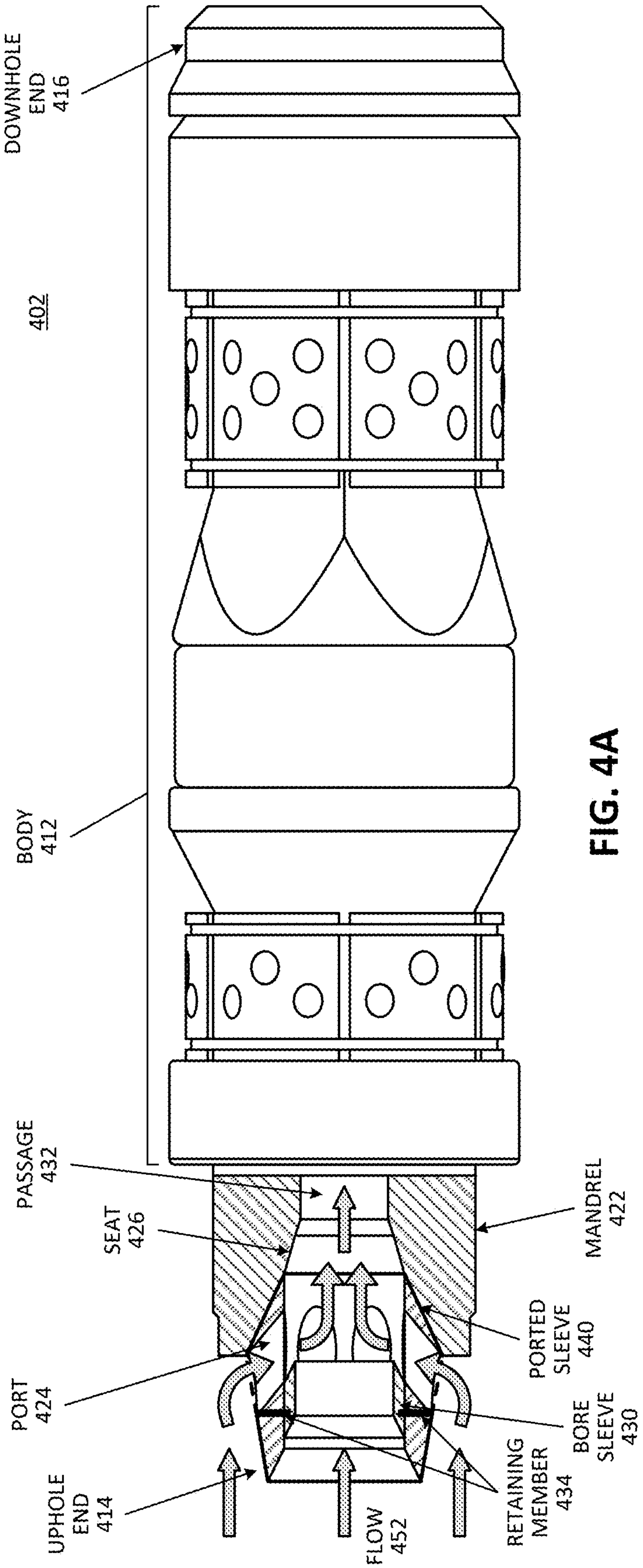
FIG. 4A is an example of a downhole barrier tool with a ported sleeve installed onto a mandrel seat and a bore sleeve installed into the ported sleeve.

FIG. 4A is an example of a downhole barrier tool with a ported sleeve installed onto a mandrel seat. Assembly 402 is an example of a plug assembly in accordance with an example of plug 110 of system 100 or an example of assembly 200. Assembly 402 illustrates an example of a barrier tool with a bore sleeve installed into a ported sleeve with a retaining member, holding a frac ball in place with the bore sleeve, as described below with reference to FIG. 4B.

Assembly 402 represents a frac plug having body 412, uphole end 414, and downhole end 416. Assembly 402 includes mandrel 422, which has passage 432 through an inner diameter of the plug to enable fluid flow from uphole end 414 to downhole end 416. In assembly 402, flow 452 can flow through the inner diameter of bore sleeve 430.

Assembly 402 includes ported sleeve 440, which is a part separate from mandrel 422 and is installed onto mandrel 422. In one example, ported sleeve 440 is specifically installed on seat 426 of mandrel 422. Port 424 represents ports to the inner diameter of mandrel 422, through ported sleeve 440. Thus, in assembly 402, mandrel 422 and ported sleeve 440 are separate components that are mechanically fixed together.

Assembly 402 illustrates retaining member 434, which represents a force-adjustable release mechanism for the plug. In one example, retaining member 434 is adjustable to different amounts of force to release or shear the retainer. Retaining member 434 secures bore sleeve 430 in an initial position, holding the position of bore sleeve 430 relative to port 424. Bore sleeve 430 is within ported sleeve 440.

Figure 4B:
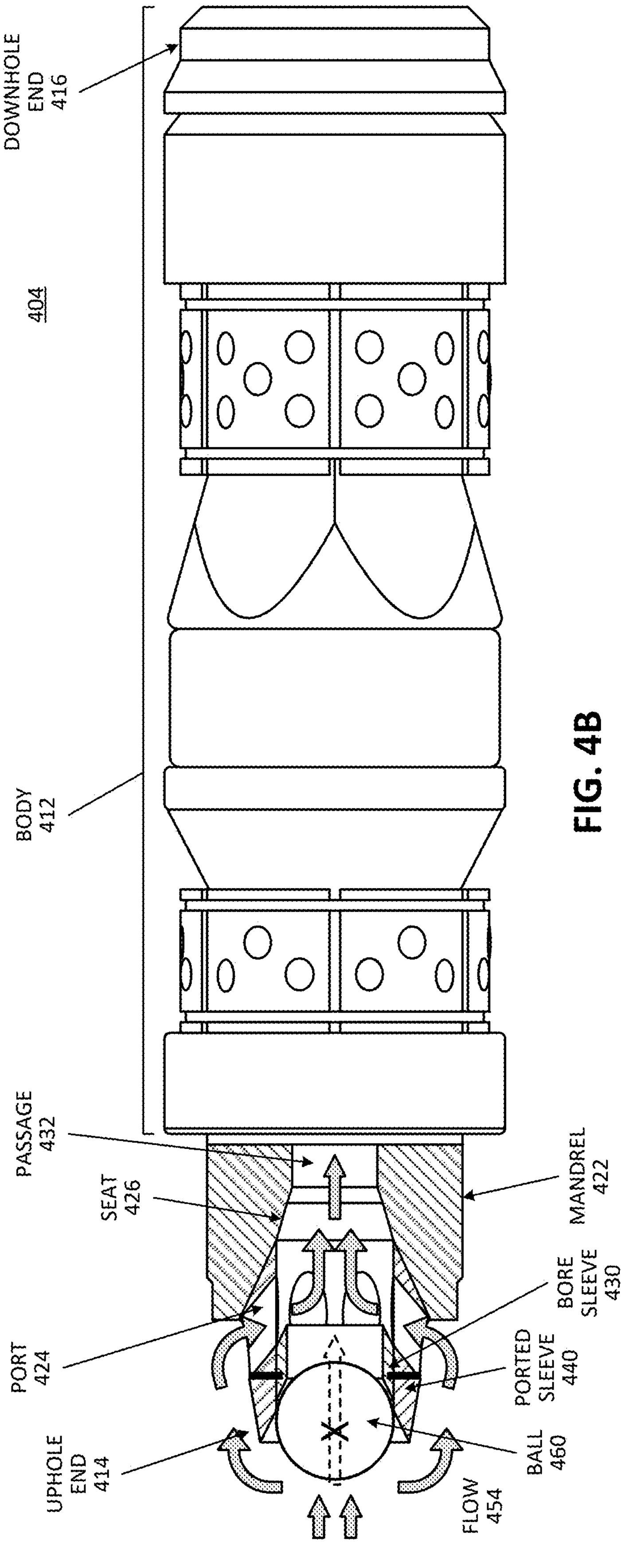
FIG. 4B is an example of the downhole barrier tool of FIG. 4A with a frac ball held by a bore sleeve in the ported sleeve.

FIG. 4B is an example of the downhole barrier tool of FIG. 4A with a frac ball held by a bore sleeve in the ported sleeve. Assembly 404 represents assembly 402, with ball 460 set against bore sleeve 430. With ball 460 set against bore sleeve 430, flow 454 flows around the ball through port 424 rather than through the inner sleeve.

Ball 460 represents a valve member, such as a frac ball or a dart. Bore sleeve 430 holds ball 460 in a way to block flow 454 from going through the inner diameter directly at uphole end 414. Flow 454 does not pass through bore sleeve 430, and only passes through port 424 with ball 460 seated against bore sleeve 430. Retaining member 434 holds bore sleeve 430, which in turns hold ball 460 when ball 460 is in contact with bore sleeve 430 due to downhole pressure on assembly 404.

The restriction and redirection of fluid flow 454 caused by ball 460 contacting bore sleeve 430 results in an increase in the wellbore pressure at uphole end 414, above the fracturing plug assembly. It will be understood that increasing the flow rate of flow 454 will increase the downhole pressure on uphole end 414.

Figure 4C:
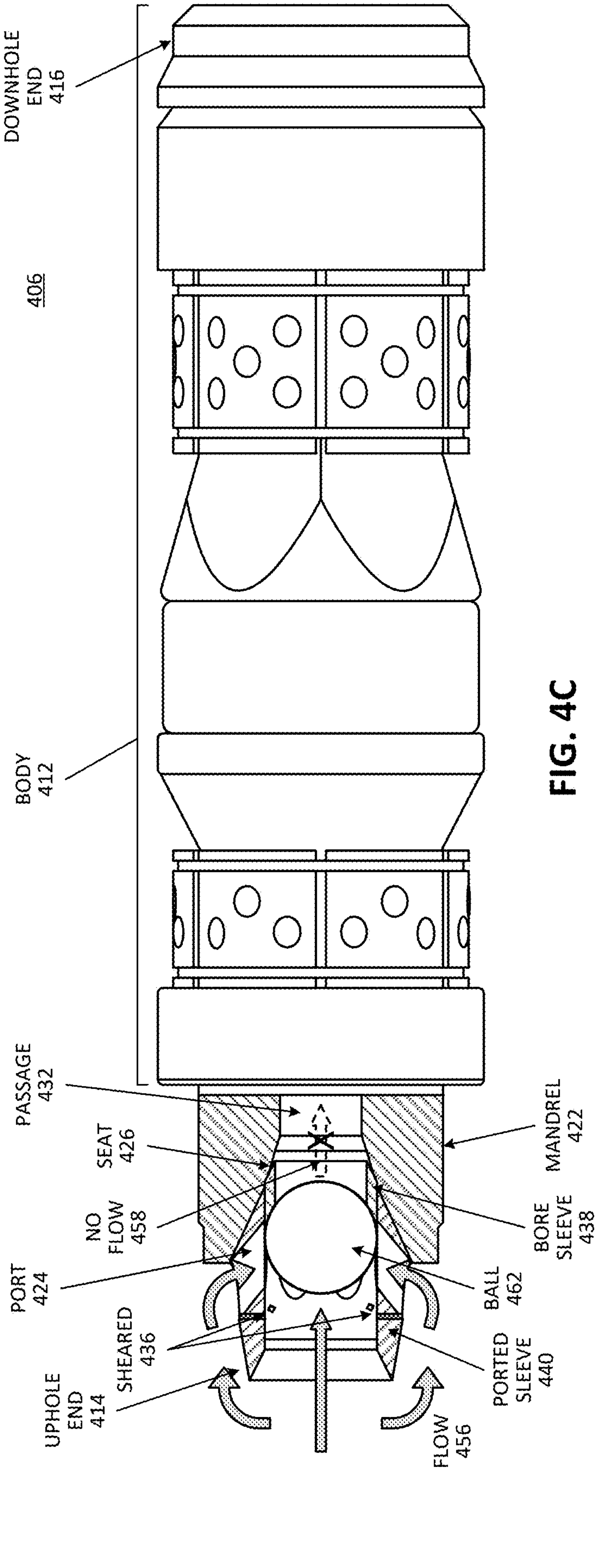
FIG. 4C is an example of the downhole barrier tool of FIG. 4B with the frac ball in contact with the bore sleeve, which is in contact with a mandrel seat.

FIG. 4C is an example of the downhole barrier tool of FIG. 4B with the frac ball in contact with the bore sleeve, which is in contact with a mandrel seat. Assembly 406 represents assembly 404, with ball 460 set against bore sleeve 438 and bore sleeve 438 set against seat 426. With ball 460 and bore sleeve 438 set against seat 426, flow 456 does not flow through the inner diameter of the plug.

After wellbore operations have been completed, ball 460 is ready to provide pressure isolation between uphole end 414 and downhole end 416. With continued fluid flow 456 in the downhole direction, the ball applies force on the bore sleeve until a release threshold is reached or exceeded, disconnecting the bore sleeve from ported sleeve 440. Then the bore sleeve and the ball move relative to ported sleeve 440, on the inside diameter of the ported sleeve, until mechanically impeded by seat 426.

Retaining member 434 is released to allow the ball to push the bore sleeve against seat 426. In one example, as illustrated in assembly 406, the retaining member is sheared 436, releasing the bore sleeve to move internally within the mandrel to a position against seat 426, as illustrated by bore sleeve 438. The frac ball moves to a new position against seat 426, or against bore sleeve 438 which is against seat 426, as represented by ball 462.

When ball 462 pushes bore sleeve 438 against seat 426, it results in closure of the fluid flow path through passage 432, represented by no flow 458, resulting in pressure isolation between uphole end 414 and downhole end 416.

Figure 5A:
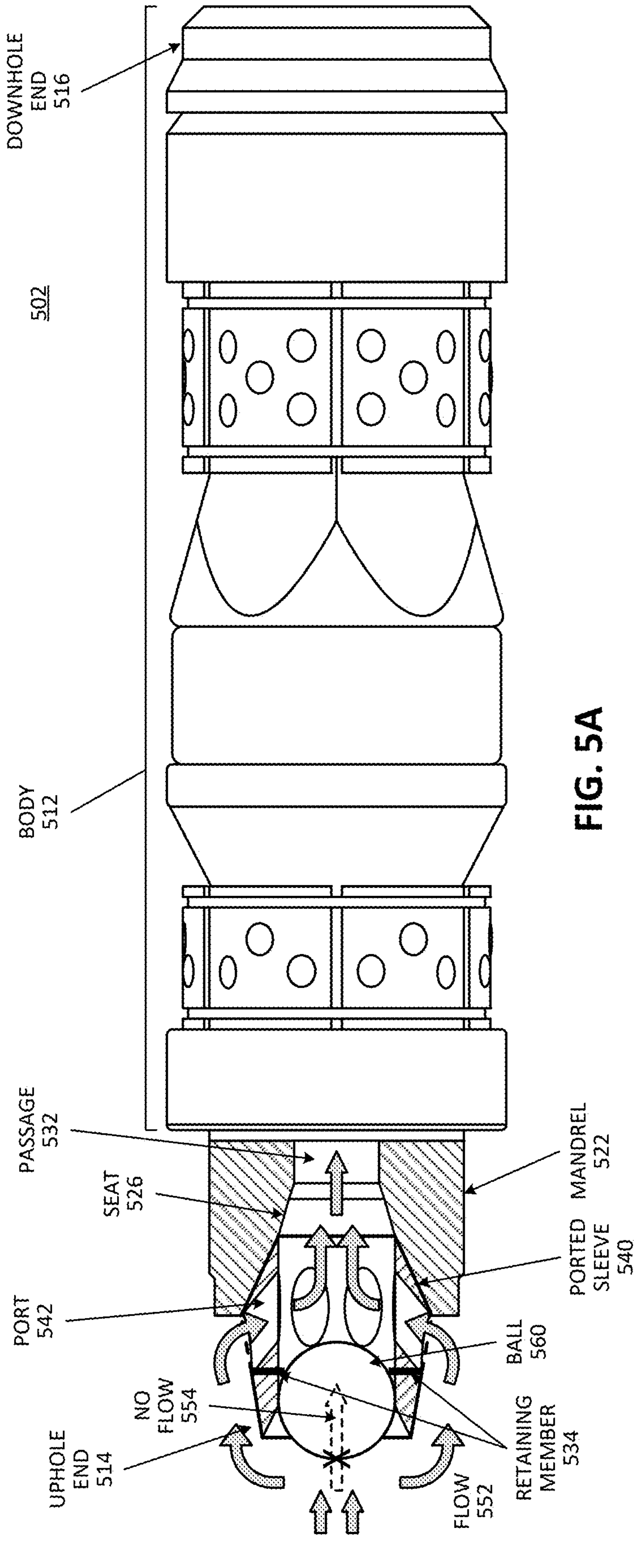
FIG. 5A is an example of a downhole barrier tool with a ported sleeve installed onto a mandrel seat and without a bore sleeve.

FIG. 5A is an example of a downhole barrier tool with a ported sleeve and without a bore sleeve. Assembly 502 is an example of a plug assembly in accordance with an example of plug 110 of system 100 or an example of assembly 200. Assembly 502 illustrates an example of a barrier tool with a ported sleeve installed with a retaining member, holding a frac ball in place within the ported sleeve.

Assembly 502 represents a frac plug having body 512, uphole end 514, and downhole end 516. Assembly 502 includes mandrel 522, which has passage 532 through an inner diameter of the plug to enable fluid flow from uphole end 514 to downhole end 516.

In one example, assembly 502 includes ported sleeve 540, which is a part separate from mandrel 522 and is installed onto mandrel 522. In one example, instead of having ported sleeve 540, assembly 502 can have a ported mandrel, where mandrel 522 has port 542, instead of having a separate ported sleeve. Thus, the ball can be directly pinned to the mandrel in another implementation.

In one example, ported sleeve 540 is specifically installed on seat 526 of mandrel 522. Port 542 represents ports to the inner diameter of mandrel 522, through ported sleeve 540. Thus, in assembly 502, mandrel 522 and ported sleeve 540 are separate components that are mechanically fixed together. In assembly 502, flow 552 flows around ball 560 and through port 542 to the inner diameter of mandrel 522. There is no flow 554 through ported sleeve 540.

Assembly 502 illustrates retaining member 534, which represents a force-adjustable release mechanism for the plug. In one example, retaining member 534 is adjustable to different amounts of force to release or shear the retainer. Retaining member 534 secures the valve in an initial position, holding the position of the valve relative to port 542. Thus, retaining member 534 secures ball 560 within ported sleeve 540 in an initial position.

Ball 560 represents a valve member, such as a frac ball or a dart. The restriction and redirection of fluid flow 552 caused by ball 560 held by retaining member 534 results in an increase in the wellbore pressure at uphole end 514, above the fracturing plug assembly. It will be understood that increasing the flow rate of flow 554 will increase the downhole pressure on uphole end 514.

Figure 5B:
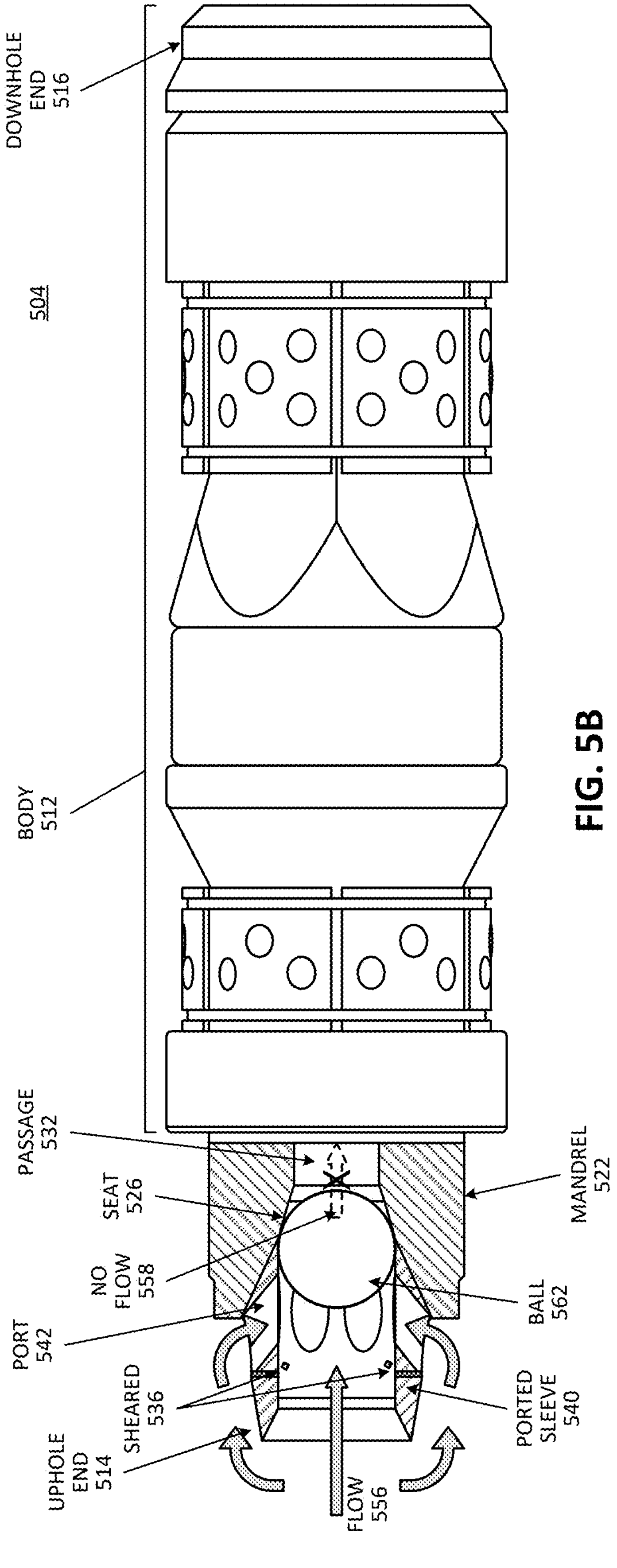
FIG. 5B is an example of the downhole barrier tool of FIG. 5A with a frac ball in contact with a mandrel seat.

FIG. 5B is an example of the downhole barrier tool of FIG. 5A with a frac ball in contact with a mandrel seat. Assembly 504 represents assembly 502, with ball 560 set against seat 526. With ball 560 set against seat 526, flow 556 does not flow through the inner diameter of the plug.

After wellbore operations have been completed, ball 560 is ready to provide pressure isolation between uphole end 514 and downhole end 516. With continued fluid flow 556 in the downhole direction, the ball applies force on the retaining member until a release threshold is reached or exceeded, disconnecting the ball from ported sleeve 540. Then the ball moves relative to ported sleeve 540, on the inside diameter of the ported sleeve, until mechanically impeded by seat 526.

Retaining member 534 is released to allow the ball to move to seat 526. In one example, as illustrated in assembly 504, the retaining member is sheared 536, releasing the ball to move internally within the mandrel to a position against seat 526, as illustrated by ball 562.

When ball 562 pushes against seat 526, it results in closure of the fluid flow path through passage 532, represented by no flow 558, resulting in pressure isolation between uphole end 514 and downhole end 516.

Figure 6:
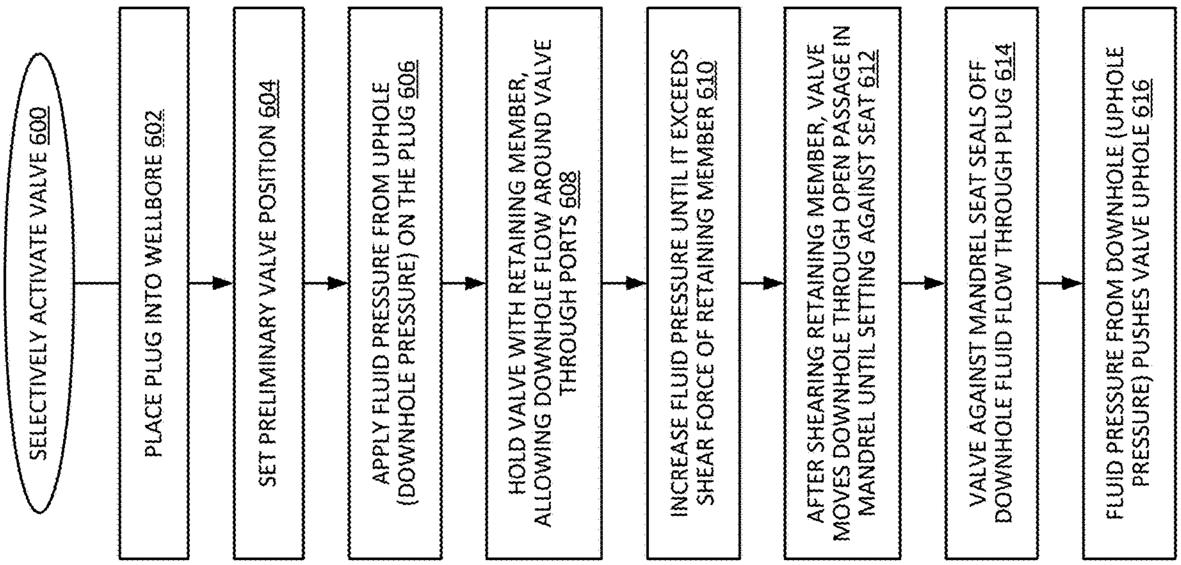
FIG. 6 is a flow diagram of an example of selectively activating a wellbore valve.

FIG. 6 is a flow diagram of an example of selectively activating a wellbore valve. Process 600 represents a process for selectively activating a valve. Process 600 can be implemented by an example of system 100, assembly 200, assembly 302, assembly 402, or assembly 502.

The operator can place equipment downhole, including placing a plug into the wellbore, at 602. The operator can set the preliminary valve position, at 604. The preliminary valve position can be set by being set against a bore sleeve that is secured to a mandrel or a ported sleeve, or the valve can be secured to the mandrel or ported sleeve.

The system can apply fluid pressure from uphole (e.g., downhole pressure) on the plug, at 606. The plug assembly holds the valve in place at the preliminary position with a retaining member, allowing downhole flow around the valve through ports in the mandrel or ported sleeve, at 608. The system can increase the fluid pressure until it exceeds the shear force of the retaining member, at 610.

After shearing the retaining member or otherwise releasing the retaining member, the valve moves downhole through the open passage in the mandrel or sleeve until setting against the mandrel seat, at 612. The valve sitting against the mandrel seat seals off downhole fluid flow through the plug, at 614. In one example, the fluid pressure from downhole (e.g., uphole pressure) pushes the valve uphole, at 616.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures of these. Illustrative treatment agents include, but are not limited to, fracturing fluids, acids, steam, water, brine, anti-corrosion agents, cement, permeability modifiers, drilling muds, emulsifiers, tracers, flow improvers, and so forth. Illustrative well operations include, but are not limited to, hydraulic fracturing, stimulation, tracer injection, cleaning, acidizing, steam injection, water flooding, cementing, and so forth.

While preferred materials for elements of the invention (e.g., components) have been described, the apparatuses of the present invention are not limited by these materials. Wood, plastics, fiber reinforced phenolics, fiber reinforced resins, elastomers, foam, metal alloys, sintered metals, ceramics, fiber, or fabric reinforce composites, and other materials may comprise some or all elements of the apparatuses in various implementations.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A fluid valve in a pipe, comprising:

a mandrel having an internal passage with an opening at each of a first end and at a second end of the mandrel, the internal passage being open from the first end to the second end of the mandrel, the mandrel having a seat structure near the first end;

a valve member to be held in an initial position by a retaining member, the valve member to block the opening at the first end when in the initial position;

ports, separate from the opening at the first end, to allow fluid to pass around the valve member to the internal passage from the first end when the valve member is in the initial position;

a bore sleeve movable within the open internal passage, the bore sleeve to be secured to the mandrel with the retaining member, wherein the valve member to be held by the retaining member comprises the valve member to abut the bore sleeve, which is held by the retaining member; and wherein, in response to an increase in fluid pressure exceeding a shear force of the retaining member, the retaining member is to shear, and the valve member is to move from the initial position to a second position, pushing into the seat structure, blocking the internal passage to prevent fluid flow through the second end of the mandrel.

2. The fluid valve of claim 1, wherein the valve member comprises a frac ball.

3. The fluid valve of claim 1, wherein the valve member comprises a dart.

4. The fluid valve of claim 1, wherein the ports are through the mandrel.

5. The fluid valve of claim 1, wherein, in response to the increase in fluid pressure exceeding the shear force of the retaining member, the valve member is to push the bore sleeve into the seat structure, the valve member and the bore sleeve to block the internal passage.

6. The fluid valve of claim 1, wherein the open internal passage through the mandrel comprises a first open passage, and further comprising a ported sleeve, separate from the mandrel, the ported sleeve having a second open passage coupled to the first open passage, wherein the ports are through the ported sleeve, and wherein the ported sleeve is mechanically secured to the mandrel.

7. The fluid valve of claim 1, wherein the retaining member has a selectable shear strength for different applications having different fluid pressure capabilities.

8. A method for a fluid valve, comprising:

applying fluid pressure at a first end of a mandrel, the mandrel having an internal passage with an opening at each of the first end and at a second end, the internal passage being open from the first end to the second end of the mandrel, the mandrel having a seat structure near the first end;

holding a valve member in an initial position with a retaining member, to block the opening at the first end, including securing a bore sleeve with the retaining member, the bore sleeve movable within the internal passage, wherein holding the valve member comprises the valve member abutting the bore sleeve within the open internal passage;

allowing fluid to pass around the valve member to the open internal passage through ports separate from the opening at the first end when the valve member is in the initial position;

increasing the fluid pressure to exceed a shear force of the retaining member; and in response to the fluid pressure exceeding the shear force of the retaining member, shearing the retaining member to allow the valve member to move from the initial position to a second position, pushing into the seat structure, blocking the internal passage to prevent fluid flow through the second end of the mandrel.

9. The method of claim 8, wherein holding the valve member with the retaining member comprises securing a ported sleeve with the retaining member, wherein the ports are through the ported sleeve, the ported sleeve to hold the valve member.

10. The method of claim 8, wherein the retaining member has a selectable shear strength for different applications having different fluid pressure capabilities.

* * * * *